(12) United States Patent
Sureshan

(10) Patent No.: US 7,400,057 B2
(45) Date of Patent: Jul. 15, 2008

(54) OMNI-DIRECTIONAL WIND TURBINE

(75) Inventor: Vaheisvaran Sureshan, Sydney (AU)

(73) Assignee: Katru Eco-Energy Group Pte. Ltd, Singapore (SG)

( * ) Notice: Subject to any disclaimer, the term of this patent is extended or adjusted under 35 U.S.C. 154(b) by 0 days.

(21) Appl. No.: 11/820,123

(22) Filed: Jun. 18, 2007

(65) Prior Publication Data

US 2008/0023964 A1    Jan. 31, 2008

Related U.S. Application Data

(63) Continuation of application No. PCT/AU2005/001882, filed on Dec. 15, 2005.

(30) Foreign Application Priority Data

Dec. 23, 2004   (AU) .............................. 2004907279

(51) Int. Cl.
*F03D 9/00* (2006.01)

(52) U.S. Cl. .......................... 290/55; 290/44

(58) Field of Classification Search .................... 290/43, 290/44, 54, 55; 415/3, 4.5
See application file for complete search history.

(56) References Cited

U.S. PATENT DOCUMENTS

| | | | | |
|---|---|---|---|---|
| 4,036,916 A | * | 7/1977 | Agsten | 261/109 |
| 4,070,131 A | * | 1/1978 | Yen | 415/4.4 |
| 4,508,973 A | | 4/1985 | Payne | |
| 5,300,817 A | * | 4/1994 | Baird | 290/55 |

(Continued)

FOREIGN PATENT DOCUMENTS

FR    1062631    4/1954

(Continued)

OTHER PUBLICATIONS

D.R. Lum (Authorized Officer), Written Opinion of the International Searching Authority, PCT/AU2005/001882, Feb. 9, 2006, Australian Patent Office.

(Continued)

*Primary Examiner*—Nicholas Ponomarenko
(74) *Attorney, Agent, or Firm*—Stetina Brunda Garred & Brucker

(57) ABSTRACT

An omni directional, vertical discharge wind turbine, consisting of a shroud that captures wind from any direction and directs it to flow vertically through a throat section where an aerofoil multi-bladed rotor is mounted. The rotor shaft is connected to an electrical power generator. The intake of the shroud incorporates multiple horizontally curved blades of toroidal form varying up to nearly twice the size of the rotor diameter, stacked, staggered and secured in place by multiple aerodynamic vertical walls in the radial direction, to form a central collection chamber for wind. The blade curving angles and the stacking arrangement are such that while accelerating and focusing the wind, across the full swept area of the rotor blades, the loss of air from the central collection chamber is significantly reduced by air flow forming a fluid dynamic gate across inactive faces. Utilizing a wedge and collar near the open top discharge the free wind stream flowing across the open top assists in increasing the flow of air through the rotor. With the increased extraction and wider operational envelop, the energy produced per annum of this omni-directional shrouded vertical wind turbine is anticipated to be much higher than that of a standard free wind turbine of same rotor diameter.

55 Claims, 5 Drawing Sheets

VERTICAL SECTION THROUGH COMPLETE SHROUD ASSEMBLY. AA

U.S. PATENT DOCUMENTS

| | | | |
|---|---|---|---|
| 6,215,199 B1 * | 4/2001 | Lysenko et al. | 290/44 |
| 6,510,687 B1 * | 1/2003 | Zaslavsky et al. | 60/398 |
| 6,590,300 B1 * | 7/2003 | Preito Santiago | 290/55 |
| 6,717,285 B2 * | 4/2004 | Ferraro | 290/55 |
| 6,841,894 B2 * | 1/2005 | Gomez Gomar | 290/55 |

FOREIGN PATENT DOCUMENTS

| | | |
|---|---|---|
| RU | 2073111 | 2/1997 |
| RU | 2093702 | 10/1997 |
| RU | 2189495 | 9/2002 |
| SU | 1134771 | 1/1985 |

OTHER PUBLICATIONS

D. R. Lum (Authorized Officer), International Search Report, PCT/AU2005/001882, Feb. 9, 2006, Australian Patent Office.

* cited by examiner

VERTICAL SECTION THROUGH COMPLETE SHROUD ASSEMBLY. AA

SECTION CC
WITH DIFFUSER
& ROTOR
(OTHER DETAILS BELOW LINE
LEFT OUT FOR CLARITY)

SECTION BB
WITH WALL
& TOROIDS

TOROID BLADE SHAPE & STACKING ARRANGEMENT

DIFFUSER WALL WITH
WEDGE, COLLAR AND
AND BLEED CHANNELS

AEROFOIL VERTICAL
SUPPORT WALL WITH
AIR BLEED CHANNELS

TOROID BLADE WITH
AIR BLEED CHANNELS

OMNI DIRECTIONAL
WIND TURBINE

OMNI-DIRECTIONAL WIND TURBINE

CROSS-REFERENCE TO RELATED APPLICATIONS

The present application is a continuation of PCT/AU2005/001882 filed on Dec. 14, 2005, which claims priority to an Australian provisional application no AU2004907279 on Dec. 23, 2004.

STATEMENT RE: FEDERALLY SPONSORED RESEARCH/DEVELOPMENT

Not Applicable

BACKGROUND

This invention relates to a shrouded omni-directional wind turbine which discharges vertically and is capable of extracting higher quantities of electric power than a free wind turbine of equal diameter.

The exponentially rising global demand for electric power and the significant and entrenched damage caused to the ecosystem through the generation of such power utilizing non-renewable fuels such as oil and coal, together with the rapid depletion of these resources and the lack of other natural resources to keep up with growing demand, has in the recent past provided new impetus to look towards the further development of renewable energy sources.

Mankind has attempted to utilize the vast amount of power available in the wind, for over several centuries and has been successful in powering sailing ships, pumping water and grinding grain. Although, since the rotating electric generator was invented some attempts have been made to utilize wind power to drive generators, it is only in the last 50 years, with the discovery of strong and light weight materials; wind power has begun to be considered economically viable for this purpose.

Wind turbines can be broadly divided into two groups. The "horizontal" types, as in the very familiar Dutch windmill and the "vertical" types, as in the wind speed measuring cup/paddle or Darrieus airfoil unit. Although, "vertical" wind machines are well known for their simplicity of design, strength and fewer moving parts, due to the fact that they need not be constantly rotated to face the wind direction, their lower efficiencies in comparison to the horizontal type units has resulted in the horizontal type units being favored.

The commonly recognized theoretical analysis of wind power production indicates that, the power extractable from the wind is in proportion to the intercepted wind area and the cube of the wind velocity. For wind turbines operating in free wind conditions, only by increasing the blade diameters to sweep larger areas can more power be extracted from the wind. This can now be seen in commercial power supply units having blade diameters in excess of 150 meters. According to Betz's Law the theoretical maximum level of power extraction is limited to no more than 59% of that available in a square meter of free wind. However, even with today's high-tech machines this level is far from being achieved at present.

An alternative approach has been to utilize diffusers, shrouds or other devices to accelerate the free wind to increase its energy density per square meter, prior to the wind reaching the rotor blades. As the energy extractable is proportional to the third power of the wind velocity, even minor accelerations can lead to significant increases in energy density and thus extractable power. This also enables the power extraction to commence at much lower wind velocities and be available for significantly longer periods during the year. Consequently these could be utilized in areas where the wind velocity is lower than that useable by the free wind turbines.

Regardless of these advantages, the fact that a large shroud type structure needs to be flexibly mounted in a highly wind exposed position and be rotatable to face the wind has been a major draw back of such devices. Also, as the free wind speed increases, the magnification through the use of the shroud elevates the rotor speed to extremely high levels with consequent high stress levels on the rotor blades.

Vertically discharging shrouds which accelerate wind and containing wind turbines located in the vertical section have been attempted in an effort to combine the best of both applications.

These are mainly of two different categories. First category consists of units which, create a cyclonic action through spiral air movement formation (vortex) utilizing the free wind, to either generate a pressure differential for suction of the air through a throat or directly impinge on the rotor to produce thrust for rotation. The second category consists of units through which the air movement is substantially irrotational. They rely on the free wind being accelerated and transported via concentric or segmented channels from the periphery of a cylindrical unit, to be discharged to a selected segment of the swept area of the rotor. The rotors used in both of these category units range from axial aerofoil type to mixed flow or centrifugal types. The first category offered much promise as it has the capacity for augmentation effects of well over ten fold but as yet these have not met commercial realization. The second category has limited augmentation effects as it relies on the acceleration of the free wind purely through direct concentration of the wind stream to increase its energy density. The concentration is achieved by reducing the cross section area through which the wind passes. This direct concentration has a maximum limit capability, as in an open environment the wind will simply by pass ('leak') any constricting device.

The main draw backs of these devices have been the significant cost of construction, due to complex shape requirements, high number of moving parts, high cyclic loading on the rotors as they crossed from active segments to inactive segments in their swept area, the leakage losses through inactive sections and the significant energy losses in forcing the free wind to move in a highly constricted manner through the augmenting devices. The high levels of constrictions generate resistance and energy losses which need to be over come by the free wind utilizing some of its energy. In many instances these resistances tend to reduce the quantity of wind passing through the device to such low levels that the augmentation could indeed be significantly negative. Many of them also rely on additional physical air 'gates' to prevent loss of air through inactive sections. Thus even if other benefits were possible; the additional costs of any augmenting device cannot be justified. As a consequence, augmented vertical-axis machines (even horizontal units) have not been commercially attractive and have not achieved acceptance in competition with the present form of horizontal-axis wind turbines.

However, because of opposition from environmentalists with regard to, injury to migrating bird life as well as prohibition by regulating authorities sighting intolerable low frequency noise, stroboscopic light reflection effects and safety hazards associated with these large propeller machines in populated areas, many areas which would be ideal for generating wind energy, such as atop large buildings, are simply off-limits. Due to the above these machines, are remotely located significantly away from the area of power usage, thus necessitating construction of expensive power grids to transport the energy produced to the consumers, generally living in large urban areas. Consequently, there is a further reduction in available power due to losses in the transmission grid and increased costs of transmission.

In addition these machines are also not capable of being located in areas where, high levels of wind resource may be available but which experience frequent change in wind direction due to the local terrain or have periods of highly elevated wind velocities such as cyclones or twisters, as these may easily damage the fully exposed rotor blades.

It is an object of the present invention to address or at least ameliorate some of the above disadvantages.

BRIEF SUMMARY

In this specification the term "shroud" is used to denote the overall casing structure of the turbine of preferred embodiments of the invention. That is, the shroud denotes the structure surrounding and defining the central collection chamber together with the structure defining the hollow member which directs air away from the central collection chamber after it has passed through the blades of the rotating member. The rotating member itself is enclosed within this shroud structure.

In one broad form of the invention there is provided an omni-directional, shrouded vertical wind turbine for generating electricity, the omni directional, shrouded vertical wind turbine comprising:

a) a plurality of curved members defining a central collection chamber substantially expanding in a direction of airflow there within;
b) a plurality of substantially vertical support members;
c) a hollow member wherein the hollow member expands in cross section in the direction of air flow;
d) a rotating member disposed above the central collection chamber wherein the rotating member is connected to a generator to generate electricity from rotation of the rotating member;

wherein the rotating member is connected to the omni directional, shrouded vertical wind turbine and located near an inlet of the hollow member;

wherein each of the plurality of curved members is connected to at least one of the plurality of substantially vertical support members so as to form a plurality of air inlets into the central collection chamber;

wherein at least one of the plurality of curved members and the plurality of substantially vertical support members are shaped and spaced to direct air to a diametrically opposite side of an internal aspect of the omni directional, shrouded vertical wind turbine so as to form an air gate to reduce air leakage on the diametrically opposite side and adjacent sides of the internal aspect of the omni directional, shrouded vertical wind turbine;

wherein the plurality of curved members and the plurality of substantially vertical support members are shaped and spaced to focus air directly to an entire lower surface of the rotating member.

Preferably, the omni-directional, shrouded vertical wind turbine wherein the plurality of curved members include toroid shaped radially curving blades.

Preferably, the omni-directional, shrouded vertical wind turbine wherein the plurality of substantially vertical support members includes vertical walls.

Preferably, the omni-directional, shrouded vertical wind turbine wherein the rotating member includes a horizontal—axis type wind turbine rotor, mounted vertically.

Preferably, the omni-directional, shrouded vertical wind turbine wherein the hollow member includes a diffuser.

Preferably, the omni-directional, shrouded vertical wind turbine wherein the plurality of curved members have an aerofoil cross section.

Preferably, the omni-directional, shrouded vertical wind turbine wherein all of the plurality of curved members have varying perimeter diameters and annular diameters.

Preferably, the omni-directional, shrouded vertical wind turbine wherein the plurality of curved members are secured in place in a concentric arrangement.

Preferably, the omni-directional, shrouded vertical wind turbine wherein the plurality of curved members are vertically staggered.

Preferably, the omni-directional, shrouded vertical wind turbine wherein the plurality of curved members are disposed in a stacked arrangement.

Preferably, the omni-directional, shrouded vertical wind turbine wherein the plurality of curved members have an overlapping arrangement.

Preferably, the omni-directional, shrouded vertical wind turbine wherein the plurality of curved members form a central collection chamber that expands in cross section from a location furthest from the rotating member to a location nearest the rotating member.

Preferably, the omni-directional, shrouded vertical wind turbine wherein the central collection chamber converges towards a central throat region.

Preferably, the omni-directional, shrouded vertical wind turbine wherein the central collection chamber is continuous with an internal aspect of the hollow member.

Preferably, the omni-directional, shrouded vertical wind turbine wherein the plurality of substantially vertical support members are aerodynamically shaped.

Preferably, the omni-directional, shrouded vertical wind turbine wherein the rotating member is mounted, with its axis vertical, near the central throat region.

Preferably, the omni-directional, shrouded vertical wind turbine wherein the rotating member includes airfoil blades.

Preferably, the omni-directional, shrouded vertical wind turbine wherein focusing of air entering the shroud by the plurality of curved members results in the air gate being formed across air passages formed by inactive members of the plurality of curved members so as to reduce air leakage.

Preferably, the omni-directional, shrouded vertical wind turbine wherein the lowermost of the plurality of curved members is shaped and configured to direct the air to the inactive curved members at a lower pressure than air external to the shroud so as to contribute to the air gate.

Preferably, the omni-directional, shrouded vertical wind turbine wherein the orientation of the plurality of curved members and the plurality of substantially vertical support members receive and use wind coming from substantially any direction.

Preferably, the omni-directional, shrouded vertical wind turbine wherein the orientation of the plurality of curved members and the plurality of substantially vertical support members directs air across the full swept area of the rotating member.

Preferably, the omni-directional, shrouded vertical wind turbine wherein the rotating member is connected via a rotating shaft to an electricity generating power train assembly and device.

Preferably, the omni-directional, shrouded vertical wind turbine wherein between 3 and 6 substantially vertical support members are included to secure the plurality of curved members, between a bell mouth upper body and a base supporting plate.

Preferably, the omni-directional, shrouded vertical wind turbine wherein the plurality of substantially vertical support members include a reversed aerofoil section with identical surface curvatures on both vertical wall faces of the reversed aerofoil section.

Preferably, the omni-directional, shrouded vertical wind turbine wherein the plurality of substantially vertical support members has boundary layer preserving air channels formed from a leading edge to a trailing half of both faces of each of the plurality of substantially vertical support members.

Preferably, the omni-directional, shrouded vertical wind turbine wherein the boundary layer preserving air channels exit both faces of each of the plurality of substantially vertical support members tangentially at an angle less than 15 degrees to an outer surface.

Preferably, the omni-directional, shrouded vertical wind turbine having the plurality of substantially vertical support members arranged radially at equal intervals, from the plurality of air inlets to a perimeter of the central collection chamber.

Preferably, the omni-directional, shrouded vertical wind turbine wherein the plurality of substantially vertical support members includes an aerofoil wall blade thickness being between 35%-50% of chord length.

Preferably, the omni-directional, shrouded vertical wind turbine wherein a thickest point of each of the plurality of substantially vertical support members is greater than 51% of the chord length from the leading edge.

Preferably, the omni-directional, shrouded vertical wind turbine with an included angle between two faces of each of the plurality of substantially vertical support members being in the range 75-150 degrees and within 15% of the chord length from a trailing edge.

Preferably, the omni-directional, shrouded vertical wind turbine including four or more, horizontal to near vertical curved toroidal blades varying in internal annulus diameter from 20% to 145% of the rotor diameter.

Preferably, the omni-directional, shrouded vertical wind turbine with convex and concave surface radii of curvature of each of the plurality of curved members being equal to between 25% and 55% of the diameter of the rotating member.

Preferably, the omni-directional, shrouded vertical wind turbine wherein the plurality of curved members start to curve with an angle less than 20 degrees to the horizontal at an outer diameter and finish at a vertical bending angle of between 50 to 70 degrees to a horizontal direction.

Preferably, the omni-directional, shrouded vertical wind turbine with a slope of a shortest straight line connecting an inner perimeter of a largest of the plurality of curved members to an inner perimeter of any of the other plurality of curved members and any vertical axis being between 5 to 35 degrees.

Preferably, the omni-directional, shrouded vertical wind turbine with the plurality of curved members stacked with spacing in between the plurality of curved members such that a leading edge and trailing edge of each of the plurality of curved members overlap by a minimum amount of 2% of a diameter of the rotating member.

Preferably, the omni-directional, shrouded vertical wind turbine with the plurality of curved members focusing air entering the shroud across a full swept area of the rotating member.

Preferably, the omni-directional, shrouded vertical wind turbine where an internal exit passage area of the omni-directional wind turbine is a minimum of 25% and a maximum 75% of an external perimeter entry passage area between any pair of the plurality of curved members.

Preferably, the omni-directional, shrouded vertical wind turbine where the throat region has an area that is not less than 70% of the annular core area of the uppermost member of the plurality of curved members.

Preferably, the omni-directional, shrouded vertical wind turbine wherein the uppermost member of the plurality of curved members is a bell mouth toroid blade.

Preferably, the omni-directional, shrouded vertical wind turbine including multiple air passages formed within at least one of the plurality of curved members to transfer air from a concave surface side to a convex surface side of the at least one of the plurality of curved members.

Preferably, the omni-directional, shrouded vertical wind turbine including multiple air passages terminating and exiting the convex surface side of at least one of the plurality of curved members tangentially at less than 15 degrees to a surface of the at least one of the plurality of curved members.

Preferably, the omni-directional, shrouded vertical wind turbine where a discharge outlet of a concentric open top of the hollow member has a diameter that is between 130% and 180% of the diameter of the rotating member.

Preferably, the omni-directional, shrouded vertical wind turbine where an open top discharge outlet of the hollow member is provided with a horizontal wedge and collar around its perimeter.

Preferably, the omni-directional, shrouded vertical wind turbine with the wedge located below an outlet of the hollow member at a height of between 7%-19% of an upper diameter of the hollow member.

Preferably, the omni-directional, shrouded vertical wind turbine where a face length of the wedge is between 135%-160% of a height of the collar of the hollow member.

Preferably, the omni-directional, shrouded vertical wind turbine including additional mini-wedges placed circumferentially around an external body of the hollow member and spaced evenly below a main wedge with multiple air passages from an outer surface to an inside surface of the hollow member.

Preferably, the omni-directional, shrouded vertical wind turbine including multiple air passages terminating and exiting an internal face of the hollow member tangentially at less than 15 degrees to an outer surface of the hollow member.

Preferably, the omni-directional, shrouded vertical wind turbine where an electricity generating unit is placed directly above the rotating member in an independently supported nacelle that is down stream of a shadow of the rotating member.

Preferably, the omni-directional, shrouded vertical wind turbine having the nacelle secured by a "sloped" radial support structure connected to the hollow member.

Preferably, the omni-directional, shrouded vertical wind turbine where electricity generating units are placed directly below the rotating member in an independently supported rotor hub nose cone.

Preferably, the omni-directional, shrouded vertical wind turbine having the nose cone secured by a column support structure extending from a base supporting plate to the nose cone.

Preferably, the omni-directional, shrouded vertical wind turbine where the rotating member is connected to a complete power generation assembly via a rotating shaft on supporting bearings.

Preferably, the omni-directional, shrouded vertical wind turbine wherein the plurality of curved members includes non toroidal vertically curved blades connected to each other in a closed polygon arrangement.

Preferably, the omni-directional, shrouded vertical wind turbine with the sloping surface of the collar forming an angle between 5-20 degrees to a vertical direction.

Preferably, the omni-directional, shrouded vertical wind turbine wherein the hollow member is substantially semi ellipsoid with angles of tangent specified at a starting location on the ellipsoid and at a finishing location.

Preferably, the omni-directional, shrouded vertical wind turbine where an angle formed by an upper surface of the wedge to a horizontal is between 10-60 degrees.

In a further broad form of the invention there is provided a hollow member for use on an omni-directional, shrouded vertical wind turbine for generating electricity wherein the hollow member expands in cross section in a direction of air flow;

wherein a rate at which the hollow member expands in cross section progressively reduces.

Preferably, the hollow member wherein the hollow member includes a diffuser.

Preferably, the hollow member wherein a discharge outlet of a concentric open top of the hollow member has a diameter that is between 130% and 180% of the diameter of a rotating member.

Preferably, the hollow member wherein an open top discharge outlet of the hollow member is provided with a horizontal wedge and collar around its perimeter.

Preferably, the hollow member wherein the wedge is located below an outlet of the hollow member at a height of between 7%-19% of an upper diameter of the hollow member.

Preferably, the hollow member wherein a face length of the wedge is between 135%-160% of a height of the collar of the hollow member.

Preferably, the hollow member wherein additional mini-wedges placed circumferentially around an external body of the hollow member and spaced evenly below a main wedge with multiple air passages from an outer surface to an inside surface of the hollow member.

Preferably, the hollow member including multiple air passages terminating and exiting an internal face of the hollow member tangentially at less than 15 degrees to an outer surface of the hollow member.

Preferably, the hollow member where an electricity generating unit is placed directly above the rotating member in an independently supported nacelle that is down stream of a shadow of the rotating member.

Preferably, the hollow member having the nacelle secured by a "sloped" radial support structure connected to the hollow member.

Preferably, the hollow member wherein the hollow member is substantially semi ellipsoid with angles of tangent specified at a starting location on the ellipsoid and at a finishing location.

Preferably, the hollow member with the sloping surface of the collar forming an angle between 5-20 degrees to a vertical direction.

In a further broad form of the invention there is provided a method for using an omni-directional, shrouded vertical wind turbine for generating electricity comprising the steps:

using a plurality of curved members and a plurality of substantially vertical support members to collect ambient airflow into a central collection chamber from any direction in a near horizontal plane;

using the curved members and the vertical support members to change the air flow direction from a near horizontal motion to a near vertical motion;

using the curved members and the vertical support members to focus airflow from the windward side of a central collection chamber substantially directly across the full width of the chamber to a diametrically opposite side of a central collection chamber so as to substantially form an air gate on the opposite and adjacent sides of the chamber to reduce air leakage from the opposite and adjacent sides of the central collection chamber;

using the curved members and the vertical support members to direct the airflow to substantially all of the underside of a rotating member;

using a hollow member to permit the airflow leaving the rotating member to gradually return to atmospheric pressure levels.

In a further broad form of the invention there is provided a method for using a hollow member in an omni-directional, shrouded vertical wind turbine for generating electricity comprising the steps:

using a wedge and collar arrangement attached to the hollow member so as to reduce free wind interference from a windward side of the hollow member;

using wedge shaped collars attached circumferentially to an external surface of the hollow member so as to concentrate and direct a portion of the free wind to air channels formed through the hollow member and exiting tangentially to an internal surface of the hollow member;

using the channels to discharge air from the channels, parallel to a direction of main air flow within the hollow member;

wherein back pressure at a throat of the hollow member is decreased and air flow through a rotating member located near the throat of the hollow member is increased;

wherein separation of main air flow along the internal surface of the hollow member is reduced so as to permit pressure recovery within the hollow member with reduced pressure energy losses;

wherein a suction effect across an outlet of the hollow member is increased.

BRIEF DESCRIPTION OF THE DRAWINGS

The best contemplated constructional arrangements are illustrated in the accompanying drawings.

DETAILED DESCRIPTION

Figure 1:
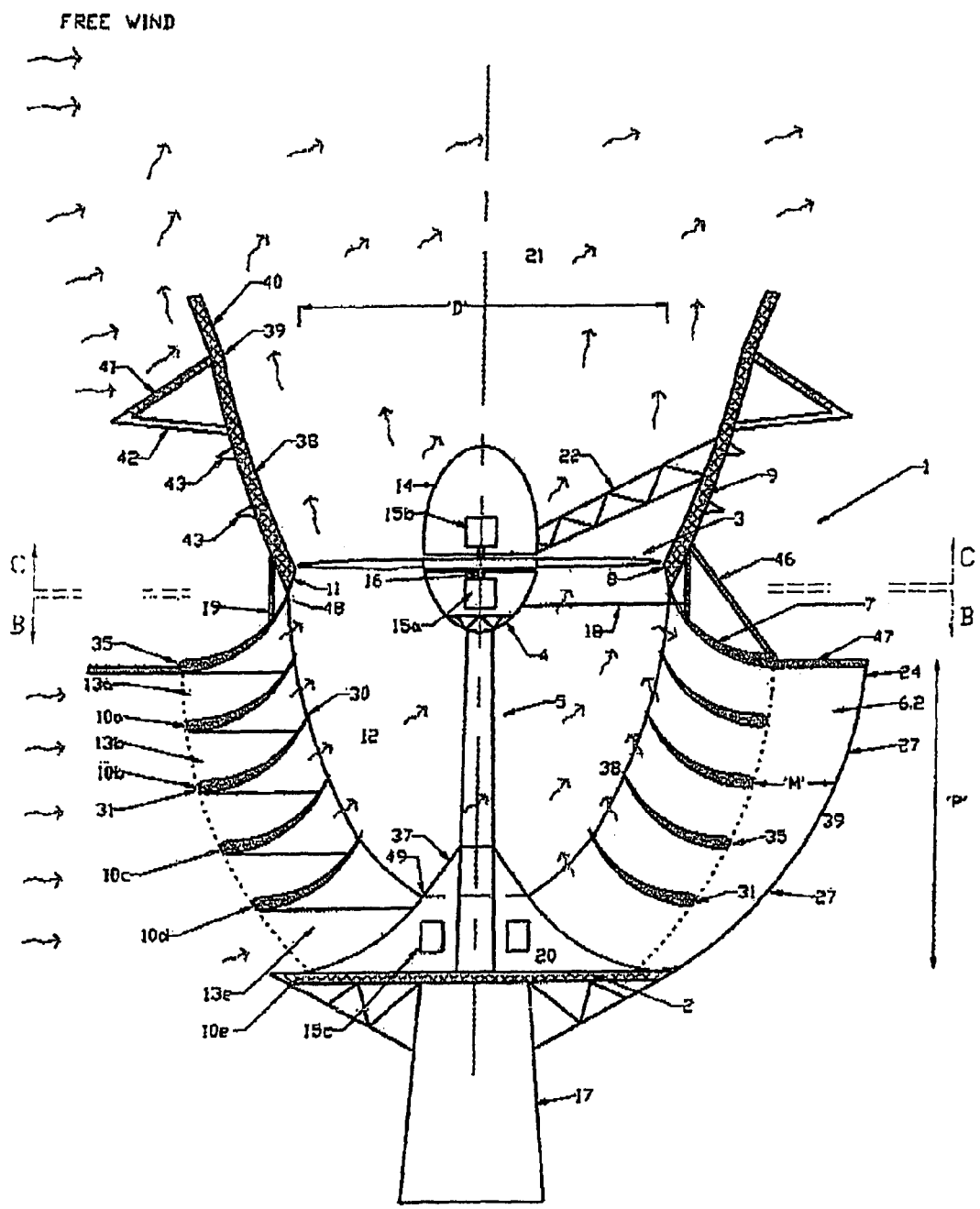
FIG. 1 Vertical Sectional view taken along line AA of FIG. 1A showing an embodiment of the shrouded wind turbine FIG. 1A Horizontal Sectional view taken along line BB of FIG. 1 showing the wall and toroids FIG. 1B Horizontal Sectional view taken along line CC of FIG. 1 showing the diffuser and rotor blades FIG. 2 Sectional view of toroid blade shape and stacking arrangement details FIG. 3 Sectional view of the ellipse shaped diffuser wall arrangement with wedge, collar and air bleed channels FIG. 4 Sectional view of aerofoil shaped vertical support wall with air bleed channels FIG. 5 Sectional view of the toroidal inlet blade with air bleed channels FIG. 6 Omni-Directional Wind Turbine—Isometric view of an embodiment of the present invention mounted on a tower structure
Figure 1B:
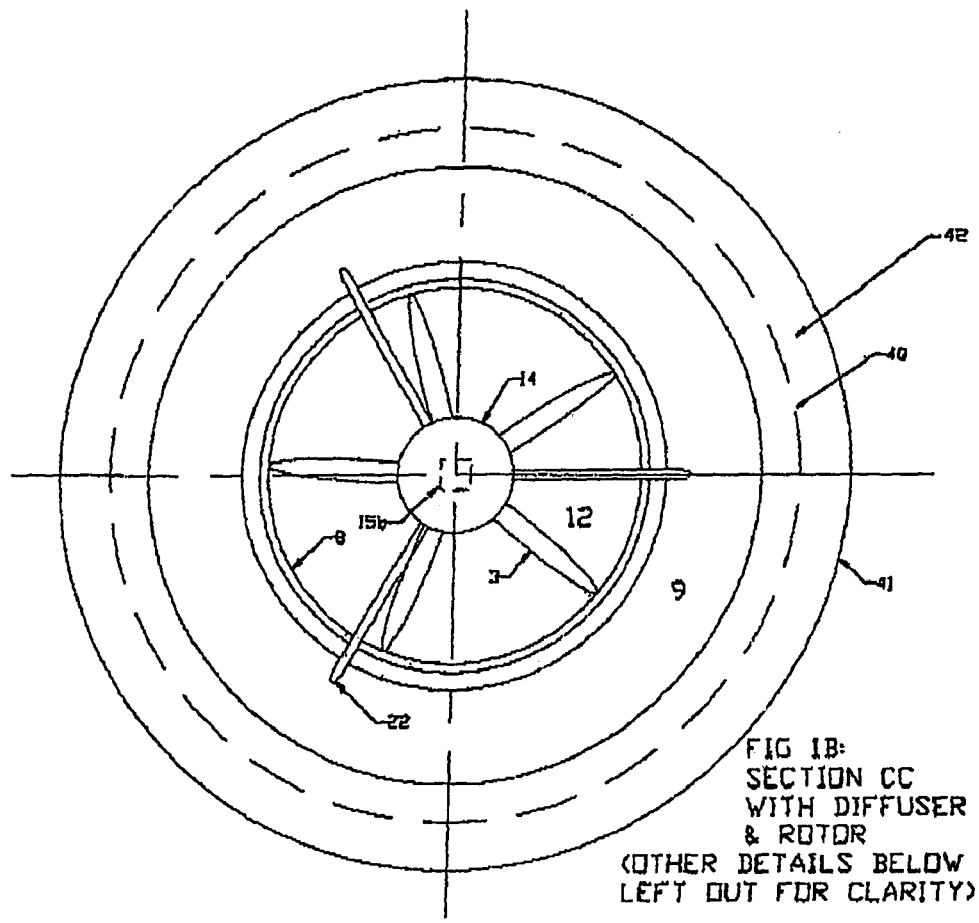

General 1 shows an embodiment of the present invention. An omni-directional augmented wind turbine assembly 1 is mounted with its base 2 rigidly connected to a support column 17.

The turbine rotor 3 of diameter 'D' with air foil rotor blades is attached via a central rotating shaft 16 to equipment within the non rotating hub 4 which is supported by a column 5 extending from the base 2 of the complete assembly. The rotor 3 is a horizontal axis type mounted vertically.

The hub 4 is retained by additional stay cables 18 attached to the shroud diffuser and supporting wall 19. The hub contains the electrical power generator 15a and all associated gear box and control mechanisms for converting the rotor's torque into electrical power. The void area 20 under the last toroid 10e can be utilized to house other electrical gear 15c required for optimizing the electrical power being supplied to the end user. A ladder to access the hub is provided through the column 5 from the base.

A streamlined nacelle 14 is provided down stream of the rotor 3 and can be attached to the rotor. This arrangement allows easy access for removal of large rotors through the top 21 of the shroud assembly. In smaller sized models the vertical support column 5 can be deleted and the nacelle, complete with all generating equipment 15b, can be supported by sloped beams 22 attached to the shroud diffuser 9 wall down stream of the rotor.

Walls

Figure 1A:
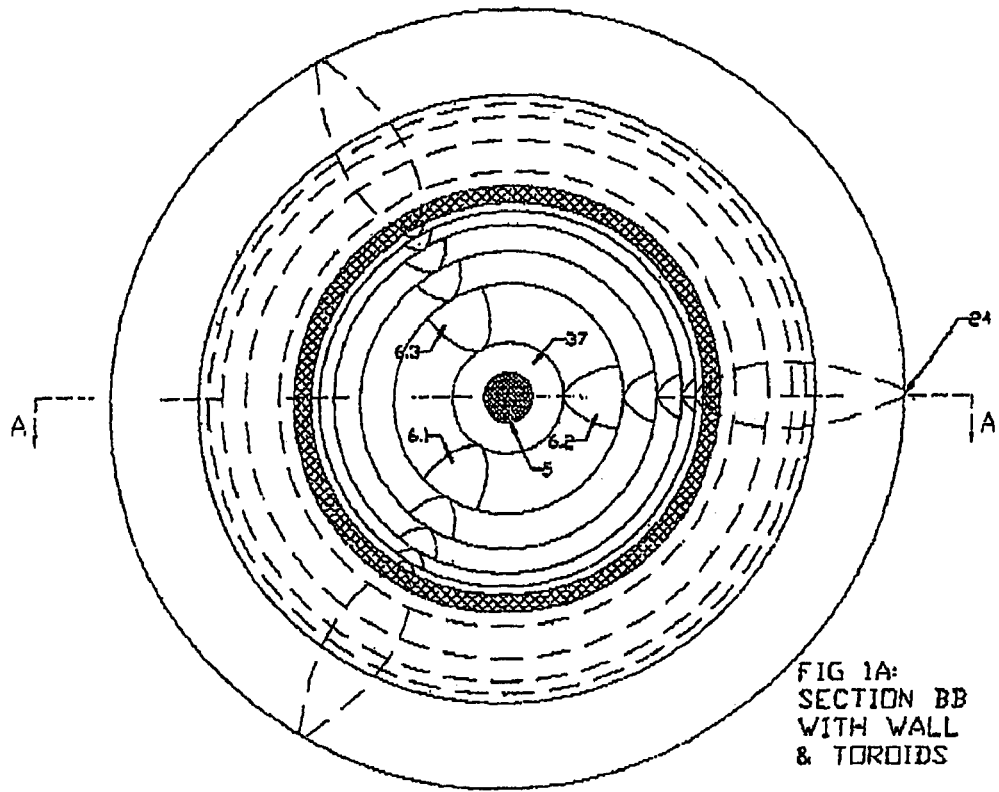

As shown in FIG. 1A Three vertical walls 6.1, 6.2 and 6.3 of aerofoil shape, arranged radially at equal angle intervals, extend in an angle to the vertical from the base 2 of the shroud to the bell mouth entry of the shroud. Radially they span from, near the central air chamber's perimeter 12 to beyond the outer perimeter of the toroids. Their extension 'M' beyond any toroid blade is limited to a maximum of 0.3 D. Their vertical height 'P' from the base 2 to the 'bell mouth' overhang disc 47 can be a minimum of 0.7 D.

Figure 4:
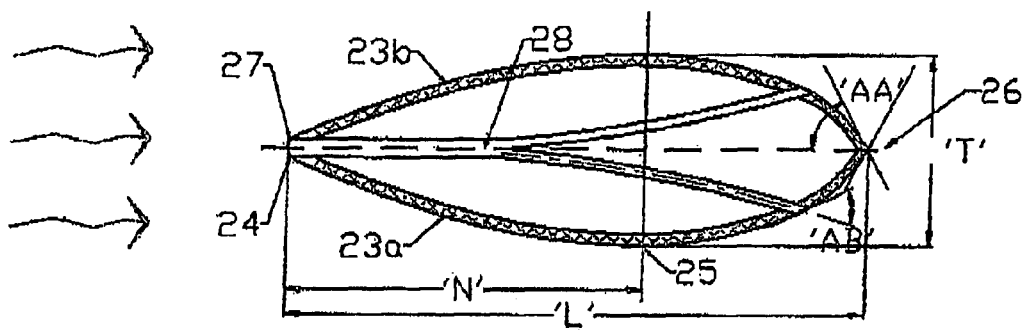

As detailed in FIG. 4 the support wall airfoils have zero-camber and are placed in a reversed configuration to the standard manner, to aerodynamically focus the air impinging on them towards the central air collection chamber 12. The thickness 'T' of each wall blade is between 35%-50% of the blade length 'L' and the thickest point 'N' of the blade is reached at not less than 51% away from the leading edge 24. The two faces 23a and 23b of the wall blade curve elliptically from the thickest point 25 towards the common trailing edge 26. At the trailing edge, both faces of the blade finish at a slope 'AA' of 60 degrees to the centerline of the blade. The included angle, which is twice 'AA', between the two wall faces ranges between 75-150 degrees, within 15% of the chord length from the trailing edge of the wall blade.

The leading edge 24 of the wall is constructed with air channel openings 27 critically placed along the vertical edge from the bell mouth to the base of the shroud. Air channels 28 from these openings permit injection of high kinetic energy air from the leading edge to the rear half of both faces of the blade to reinforce the boundary layer of air flowing and reduce air flow separation. The injection channels exit the blade surface at an angle 'AB' less than 15 degrees to the tangent to the surface. This reduces energy losses in the acceleration process.

Toroids

Figure 2:
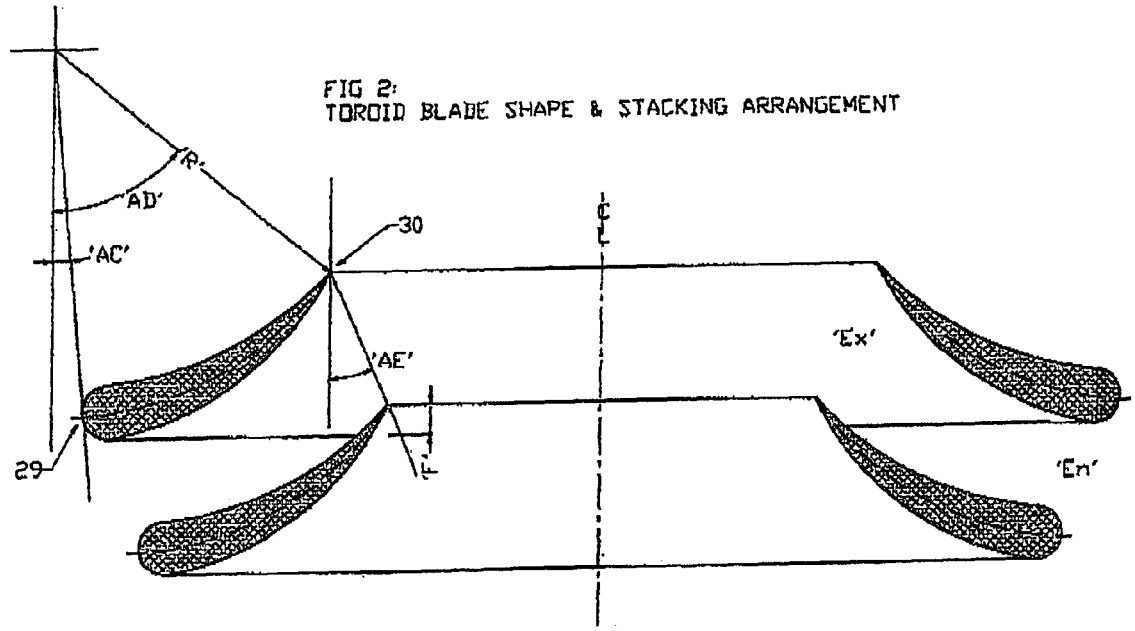

As best seen in FIG. 1, multiple toroid blades 10a, 10b, 10c, 10d and 10e placed between the base 2 and the bell mouth of the shroud as shown in FIG. 1 are secured between the vertical walls 6.1, 6.2, and 6.3. As shown in FIG. 2 these blades are of inverted aerofoil cross section with a high-camber. The blades aerodynamically accelerate and change the direction of the air flow entering the passage ways between them, from near horizontal to near vertical.

A minimum of four toroid blades 10a, 10b, 10c, 10d excluding the 'bell mouth' toroid 7 and the 'end closure' toroid 10e provide optimum energy capture and utilization. The largest toroid blade's internal (annulus) diameter is identical to the diameter of the larger opening of the converging section 11 leading to the throat. These two edges are continuously attached together at their peripheries 48 to form a single body typifying a "bell mouth" entry to the throat 8 where the rotor is located.

The toroid blades in the shroud assembly vary in their internal annulus diameter from 20%-145% of the rotor diameter. For optimum results, the smallest toroid's internal annulus 49 diameter varies between 20%-35% of the rotor diameter and the largest toroid's internal annulus 48 diameter varies between 100%-145% of the rotor diameter of the shroud.

As shown in FIG. 2, the total exit area 'Ex' of the passage way between each pair of these blades is a minimum of 25% and a maximum of 75% of the entry area 'En' of the passage way between the same blades. The blade's aerofoil section centre line has a camber radius of curvature 'R' between 0.25 D and 0.55 D. The blade's centerline angle 'AC' at the leading edge 29 is between 0-15 degrees to the horizontal 'AC' and at the trailing edge 30 is 'AD' between 50-70 degrees to the horizontal. The blades are arranged staggered in front of the shroud's bell mouth starting with the next largest toroid 10a. To ensure there is no horizontal line of sight from the windward side to the leeward side through the full shroud, the trailing edge of each subsequent toroid, overlaps the leading edge of its previous toroid by a minimum 'F' of 0.02 D. The angle 'AE' between the vertical and the shortest straight line connecting the trailing edge of the largest toroid and the trailing edges of any of the subsequent toroids can range between 5-35 degrees. The last toroid 10e which is the 'end closure' toroid is directly mounted on the base 2. A conical section 37 extends from the last toroid's trailing edge 49 to meet the support column 5, to completely enclose the last toroid's annulus. The 'bell mouth' toroid's leading edge is circumferentially extended with a flat overhang disc 47 to finish at the leading edge 24 of the vertical walls 6.1, 6.2 and 6.3.

Figure 5:
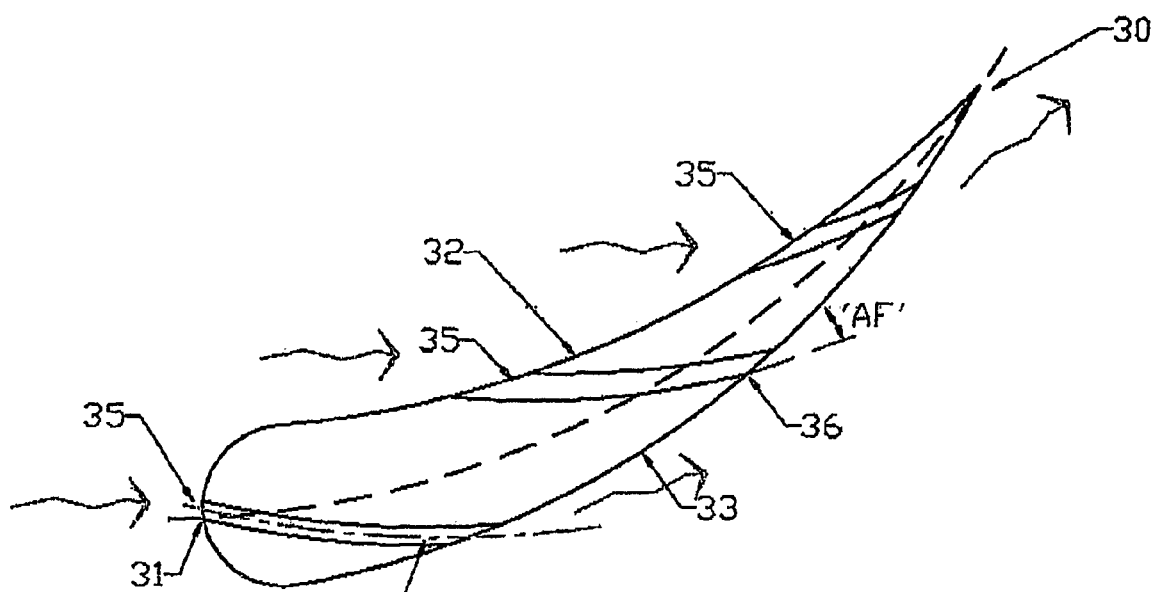
Figure 6:
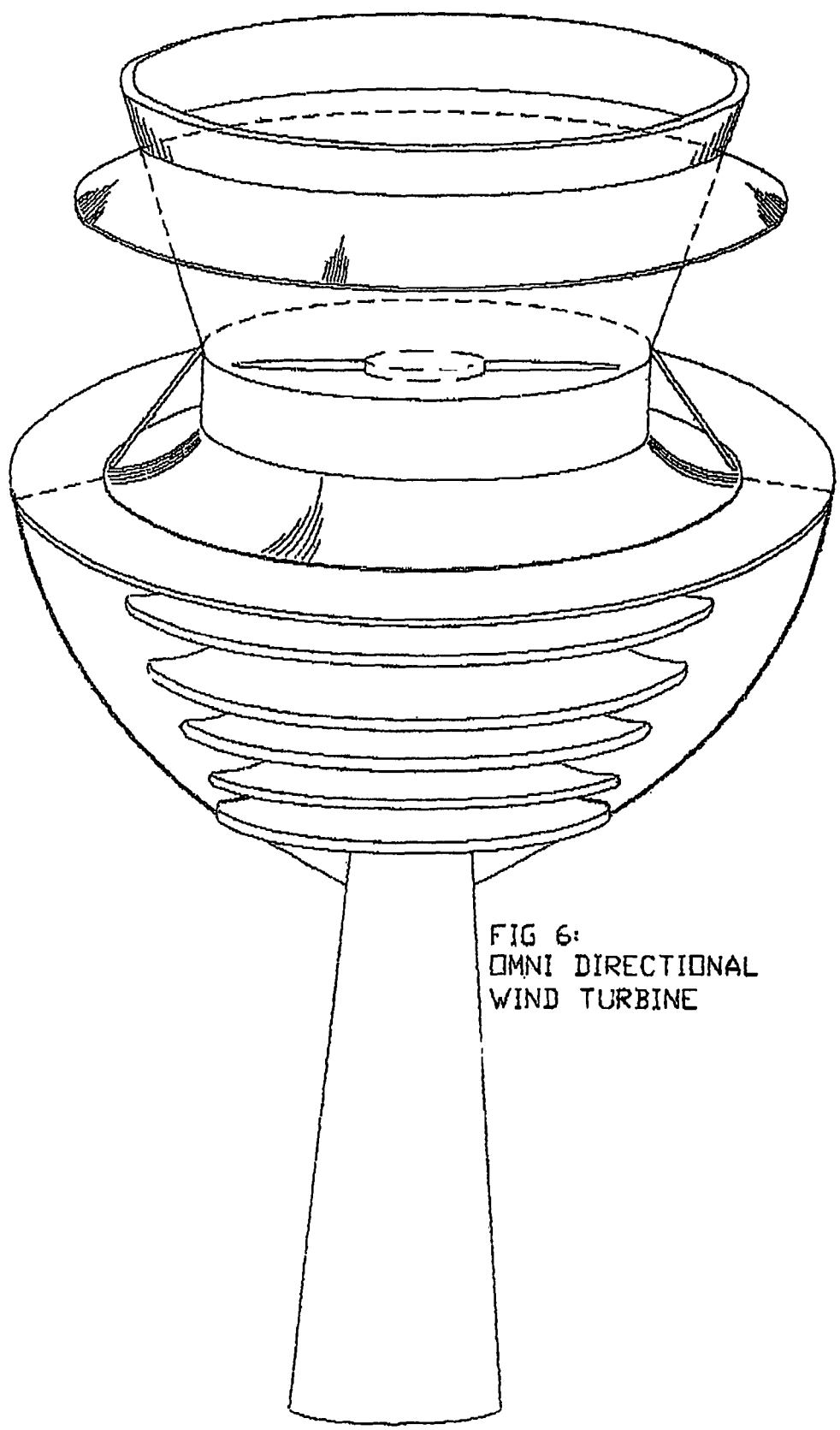

FIG. 5 shows air channel openings 35 critically placed along the perimeter of the leading edge 31 and along the concave surface 32 of each toroid 10a, 10b, 10c and 10d, including the bell mouth. These openings and associated air channels 34 permit injection of high kinetic energy air from the leading edge to the convex surface 33 of the blade to reinforce the boundary layer of air flowing along the convex surface and reduce air flow separation from the convex surface of the blade. The injection channels exit 36 the convex side at an angle 'AF' less than 15 degrees to the tangent. This measure again reduces energy losses in the acceleration process. The last toroid 10e does not require this as no air is directed along its convex surface.

Referring to FIG. 1, wind flowing from any direction and entering the shroud's horizontal passage ways 13a, 13b 13c, 13d and 13e created by the toroid blades 10a, 10b, 10c, 10d and 10e, will accelerate and exit the blades at a higher velocity into the central collection chamber 12. The lowest passage 13e which is located closest to the central axis of the chamber is designed to produce the highest exit velocity and it will be directed across the face of the inactive passage ways 38 which are not directly facing the wind. This movement of air acts as a fluid dynamic 'air gate', due to its pressure being lower than the pressure in the entry side 39 of the inactive passage ways and induces air flow into the chamber 12 via the inactive passage ways, thus significantly reducing the escape of air entering the chamber via the active passage ways.

Throat

The design of the central collection chamber 12 is such that the average air velocity from the lower part of the chamber to the upper part is nearly uniform or is increasing. As shown in FIG. 1, the bell mouth entry section toroid 7 of the shroud narrows concentrically towards the throat 8. The turbine rotor 3 is situated near down stream of the throat. The cross section area of the throat 8 of the short converging section 11 that connects the bell mouth toroid's annulus and the diffuser 9 is not less than 70% of the cross section area of the bell mouth toroid's annulus 48. As the hub 4 also reduces the throat area its diameter is limited to a maximum of 0.3 D. The higher the reduction in the cross section area, the greater the back pressure build up will be in the central collection chamber and the greater the loss of air through the inactive sections.

The air stream profile of the rotor hub 4 and nose cone is designed as a semi ellipsoid to ensure that the air approaching the throat from the active passage ways is able to flow across to the far side of the throat with minimal interference. This results in the full swept area of the rotor blades receiving air at near uniform velocities across it, reducing the cyclic stress loading on the rotor blades.

Diffuser Collar & Wedges

The shroud then expands as the concentric diffuser 9 with an open top 21. As shown in detail in FIG. 3 the diffuser takes the general form of a semi ellipsoid with the angle 'AG' of the tangent of the internal surface of the ellipsoid at the down stream of the throat 8 being a maximum of 30 degrees and a minimum of 12 degrees to the vertical. The slope of the internal surface 38 of the diffuser progressively reduces to a maximum of 5 degrees. The vertical distance 'H' from the start of the diffuser section to this point 39 is a minimum of 0.5 D. This diffuser allows the pressure of the air leaving the turbine blades, which is below atmospheric pressure to rise steadily to near ambient pressure levels. The velocity of the air decreases as the diffuser expands. The diameter of the diffuser at this location 39 is between 130%-180% of the throat diameter.

The diffuser extends and expands further for a minimum length 'J' of 7%-19% of the diffuser diameter at 39 as a collar 40 finally opening to the atmosphere 21. The internal surface of this collar section makes an angle 'AH' between 5-20 degrees to the vertical. A wedge 41 is formed along the perimeter of the outer surface of the diffuser to deflect, in combination with the collar, near vertically the free stream air approaching the diffuser from the wind ward side. This deflection creates a suction effect along the internal walls of the wind ward side of the diffuser and increases air flow exiting the diffuser, resulting in increased air flow being drawn through the throat 8. The higher side of the wedge is located to finish at the bottom end 39 of the collar 40. The angle 'AJ' formed by the upper surface of the wedge is between 10-60 degrees to the horizontal. The surface length 'K' of the wedge 41 is between 135%-160% of vertical height 'J' of the collar. The supporting underside of the wedge 42 slopes down wards towards the diffuser and can be enclosed. The length of diffuser required to achieve this same suction effect, but without this prescribed wedge and collar is more than twice as long as this arrangement.

Figure 3:
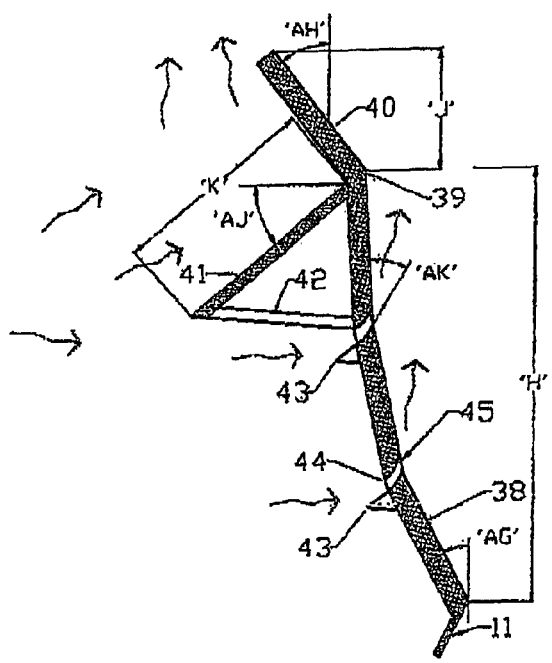

Two additional minor wedges 43 of similar shape, but less than 10% of the size, can be formed along the external perimeter of the diffuser. Air channel openings 44 and passage ways from the outer surface to the inner surface of the diffuser are formed circumferentially on the shroud body immediately above where the upper surface of these minor wedges finish as shown in FIG. 3. These openings permit injection of high kinetic energy air from the wind ward side to the inner surface of the diffuser to reinforce the boundary layer of air flowing and reduce air flow separation. The injection channels 45 exit the diffuser surface at an angle 'AK' less than 15 degrees to the tangent to the surface. This reduces energy losses in the deceleration process of the air flowing along the inner surface of the diffuser.

As, seen in FIG. 1, the complete diffuser assembly 9 and throat section 8 is supported by the vertical walls 6.1, 6.2 and 6.3 through extension walls 19 attached to the bell mouth toroid. Additional structural support struts 46 extend from the diffuser to the vertical walls 6.1, 6.2 and 6.3.

Description

With reference to the above detailed description salient features of the above described embodiments are summarized below:

There is provided an omni-directional, shrouded vertical discharge wind turbine which consists of an axial, aerofoil type rotor placed within a shroud. The open design of the shroud with minimal constriction in comparison with other vertical discharge shroud arrangements, the aerodynamic focusing, accelerating arrangements, the fluid dynamic "air gate" arrangement to prevent leakage and the wedge/collar arrangement at the discharge of the diffuser to increase suction effects through the shroud promotes much higher air volumes to flow through the rotor. The power extracted by the rotor is transferred to an electric power generator through a rotating shaft mechanism.

The shroud in the present embodiment of the invention is constructed with a convergent 'bell mouth' with toroid blades at the entry leading to a throat section. Free wind moving in any direction is intercepted by these blades and is directed in to the convergent section. The blades are curved in a radial direction, with an aerofoil cross section, starting near horizontal at the external perimeter and finishing near vertical at the internal perimeter. Each toroid blade has a different diameter. The 'bell mouth' consists of a toroid with the largest internal diameter (annulus) which is horizontally extended at the perimeter and conically extended at the annulus in the shape of a frustum. To achieve greater interception of the wind, subsequent toroidal blades are staggered and arranged concentrically in front of this "bell mouth", commencing with the next largest toroidal blade and finishing with the smallest.

The combined annuluses of the toroidal blades, define a central collection chamber which acts as a 'closed' conduit for air moving towards the full cross sectional area of the convergent throat section where the rotor is located. Air is prevented from moving horizontally, directly across, to the opposite side of the air chamber by the overlapping of the external perimeter and internal perimeter of adjacent blades.

The smallest toroidal blade's annulus is enclosed completely with a conical extension section which assists in directing the air, entering the chamber via this passage way, which is located closest to the central axis, towards the inactive toroid blade face of the chamber.

The toroidal blades are secured in position by aerodynamically shaped vertical wall plates connected perpendicularly through them. The vertical walls run from the bell mouth to the end of the last toroidal blade. These walls span across each toroidal blade, starting from before the outer perimeter of the toroidal blade and finishing at the annulus. These walls assist in increasing the free wind interception by, aerodynamically accelerating the free wind impinging on them and focusing it towards the central collection chamber with minimal energy loss in the process. This is achieved by constructing the walls as a reversed profile aerofoil which has identical curvatures on both vertical surfaces of the wall and with boundary layer strengthening air channels from the leading edge of the aerofoil, exiting at both surfaces.

The aerodynamic free wind interception decreases the approach velocity of the free wind towards the shroud and converts part of the wind's kinetic energy to pressure energy. Some of this pressure energy is utilized to overcome the losses in the toroidal blades; the remainder energy is re converted to kinetic energy when the air is accelerated through the contracting toroid blade channels, to higher velocities.

As the wind is now flowing in the central collection chamber in a near vertical direction towards the throat, the inactive sections of the toroidal blades, on the opposite side of the chamber will "appear" as plane surfaces assisting the flow of the air, entering the chamber, towards the convergent section and the throat of the shroud. The high velocity movement of air across the face of these inactive sections creates a relative negative pressure with a suction effect to drag air into the chamber performing like a fluid dynamic "air gate" resisting air leakages through the inactive sections. As the air approaches the rotor in the throat section its velocity is reduced which results in an increase in pressure with some minor air leakage via the closest inactive toroid passage way.

The toroidal blades are constructed with critically placed air passages from the concave surface side, which is subjected to direct impact by the wind, to the convex surface side. These passages permit transfer of small quantities of air from the high pressure concave surface to the convex surface. The passages are positioned to allow the transferring air to exit tangentially to the convex side and in the same direction as the main airflow over the convex surface. This reduces the separation of main air flow from the convex side (by strengthening the fluid boundary layer) thereby reducing pressure energy losses when entering the chamber.

The entry to the throat in the shroud is constructed with a converging section, in the shape of a standard frustum, which enables the air moving towards the throat to slowly accelerate with reduced pressure losses.

At the rotor energy is extracted and the pressure energy of the air stream rapidly decreases resulting in the air stream pressure reaching sub-atmospheric levels. The shroud in the present embodiment of the invention is constructed with an open top air discharge diffuser assembly in the form of an inverted ellipsoid/frustum from down stream of the throat. This enables the pressure of the air stream to regain to atmospheric levels by the air stream velocity decreasing with the conversion of part of the remaining kinetic energy to pressure energy.

The free wind passing across the discharge opening, subjects the opening to a pressure differential biased towards the free wind and air from the shroud is drawn into the free wind stream. This allows the pressure down stream of the rotor to reach greater sub-atmospheric levels resulting in even higher energy extraction from the air stream through the rotor.

The larger the discharge opening, the greater the quantity of air entrained into the free wind from the shroud; the greater this entrainment, the higher the velocity increase at the throat. However, this diffusion process needs to be carried out gradually and the diffusion cone needs to be very long to achieve this (included angle less than 15 degrees). Shorter cones with wide diffusion angles fail due to flow separation at the wall and due to the interference of the wake from the rotor by the free wind, at the discharge outlet.

In the present embodiment of the invention the diffuser length has been reduced by employing a wedge and collar attached near the discharge outlet of the diffuser. This reduces free wind interference from the windward side and enhances the suction effect across the face of the diffuser outlet. This decreases back pressure at the throat and increases the air flow through the rotor.

Additional wedge shaped collars are attached circumferentially to the external diffuser body. These concentrate and direct the free wind to air channels exiting tangentially to the diffuser internal surface in the direction of air flow. This reduces the separation of main air flow along the diffuser internal surface (by strengthening the fluid boundary layer) thereby permitting pressure recovery within the diffuser with reduced pressure energy losses.

The rotor placed near the throat intercepts the accelerated wind and extracts power from it. As the wind speed increases and the rotor's rotational speed increases, the back pressure increases and the leakage from the central collection chamber via the inactive toroidal blades increases, the pressure losses through the curving toroidal blades also significantly increase, resulting in a limiting condition at higher wind speeds by reducing and reversing the augmentation effect. This provides a beneficial feature of protecting the rotor from being exposed to very high wind speeds.

The rotor is a horizontal-axis type wind turbine rotor, mounted vertically, that is capable of extracting power from the wind. The rotor consists of twisted aerofoil section blades optimized for wind power production in this shroud arrangement. For small units the electric power generating device, coupled to a gearbox or otherwise is placed above the rotor blades, in a nacelle in the leaving air stream. The nacelle is supported by a radially sloped beam structure secured to the body of the shroud. The support structure is sufficiently sloped to ensure that any upward deflection of the rotor blades will not foul the individual support members.

For larger units, all power generating equipment will be located in the nose cone hub of the rotor in the upstream. A hollow column extending from the rotor nose cone hub to the base of the shroud assembly will support the nose cone. Single or multiple generators placed inside the nose cone should be easily accessible from the base via a ladder in the hollow column.

The circular form of the multiple toroidal blades can be replaced with any other straight or curved polygonal arrangement with blades of crescent like cross section to achieve the same.

Material

The choice of materials for the omni-directional, shrouded vertical wind turbine's vertical walls, diffuser and toroidal blades will be among strong, light weight metals, composites, sandwich construction etc. The toroidal blades and vertical walls will be of double skin construction. The rotor blade materials will involve a combination of light and strong materials that are present state of the art in the industry, to minimize start-up inertia of the rotor and enhance the response to light winds.

In Use

In use the embodiments of the present invention are adapted for use in a variety of terrains. Some embodiments can be used in remote areas and in urban areas. The shrouded nature of embodiments reduces the chance of persons or objects from being injured in the event that parts of the turbine become detached during use.

Additionally, the shroud form minimizes low frequency noise by acting as a barrier to buffer noise produced by moving components of the wind turbine. Further, shrouding also reduces visual problems associated with stroboscopic light reflection from rotating parts of the turbine.

Further, the non-requirement of a yawing mechanism to turn the rotor to face the prevailing wind direction has eliminated all gyroscopic forces on the rotor, bearings and associated mechanisms negating a major source of common failure of wind turbines.

The relative shaping and separation between the substantially vertical members (walls 6) and the curved members (toroid blades 10) ensures that air at a relatively low pressure, compared to outside air, can be directed towards inactive toroid blades 10 so as to form an air gate, thereby minimizing air leakage across inactive toroid blades 10 which can otherwise result in significant energy losses. The creation of the air gate process is also facilitated by the lower most toroid blade 10 (the smallest toroid) which can be shaped to take advantage of a semi-elliptical configuration of a central collection chamber 12 defined by the walls 6 and the toroid blades 10 so as to enhance air flow to the inactive toroid blades 10.

Additionally, the shaping and spacing of the walls 6 and toroid blades 10 facilitates air flow to substantially all of the underside of the rotor 3, thereby ensuring that an even distribution of stress across the rotor 3 is achieved so as to minimize the imposition of non uniform cyclic stresses upon the rotor 3 which could otherwise lead to fracture of the rotor 3.

The diffuser, which can include a collar 40 and at least one wedge 41, is adapted to allow a smooth transition of air leaving the turbine with outside air thereby minimizing the prospect of disruption of the airflow through the embodiment by negative feedback from the exiting airflow.

Preferred embodiments are of the substantially irrotational type which negates the many disadvantages of the prior known shrouded wind turbines by provision of a low resistance, low leakage, and shrouded vertical-discharge wind turbine with the rotor as the only moving component, which can be safely and efficiently operated over a large range of wind velocities.

Free wind entering the entry section of a shroud is directed and accelerated to a higher velocity and higher energy level as it is focused towards the rotor located within it. The entry section elements are such that while promoting air entry from the wind ward side, they prevent air leakage through the lee ward side of the complete device. As a result, even at low wind speeds the extractable wind energy level is increased and the threshold free wind velocity for the operation of the turbine is lowered, while at high wind speeds the flow across the inlet part of the shroud will stall and create high levels of turbulence and back pressure within the central collection chamber of the shroud to be self limiting. The rotor blades convert the enhanced wind energy, providing a much higher energy output than what can otherwise be obtained using a standard prior-art turbine of equal diameter at the same free wind speed.

Benefits

Embodiments of the present invention can have one or more of the following advantages over standard art vertical turbines and horizontal turbines of the shrouded and un-shrouded type.

a. The complete assembly can be placed atop a building, water tower or other similar structure without any fear of large moving components breaking under severe weather conditions and impacting on any surrounding structures or persons with disastrous consequences, as the moving rotor blades are contained in a shroud. The complete invention can be placed at a lower height as no height safety issues are encountered.

b. The invention has significantly fewer moving components by doing away with any mechanism which is required to rotate large structures to face the prevailing wind.

c. It has no physical air 'gates,' moving vanes or other such multiple components and their complex control mechanisms which need to be operating to achieve workability, maintain efficiency or safety.

d. Generation of rotor blade tip vortices which are a major source of noise from free wind turbines are significantly reduced as the blade tips are contained in a shroud.

e. It has no stroboscopic light reflection effects and poses no risk to migrating bird life as the rotating components are shielded by the shroud.

f. No gyroscopic force problems and associated component failures which arise from the turning of large rotating elements to face into the wind, are experienced.

g. It has smaller sized rotors for the same power extraction compared to conventional rotors. This allows higher rotational speeds and eliminates the use of gear boxes or only requires small ratio gear boxes for production of high frequency power supply which can be easily converted to 'grid' quality.

h. During high winds the shroud and the toroid blades reduce the exposure of the rotor blades to high velocity wind by disrupting the air flow to the rotor.

i. It is capable of being utilized in lower wind speed areas, because the shroud increases power extractability. This allows the production of useful power for longer periods. The level of increased instantaneous power and increased utilization periods result in higher annual total energy extraction over standard current art wind turbines.

j. The capability of utilizing wind of lower speed coming from rapidly changing directions, without the need for constant adjustment of the complete assembly to face the wind, allows the invention to be placed closer to suburban centers or other population centers nearer to the end consumer of the electric power.

k. The omni directional feature also allows the unit to be located in terrain where a continuous change in direction of the wind prevents satisfactory utilization of the standard horizontal axis wind turbine units.

The description of embodiments of the present invention has been made with reference to specifically preferred features. However various optimizing enhancements can be made without departing from the principles of the disclosed inventive subject matter particularly pointed out above and claimed here below.

What is claimed is:

1. An omni-directional, shrouded vertical wind turbine for generating electricity, the omni directional, shrouded vertical wind turbine comprising:

a) a plurality of curved members defining a central collection chamber substantially expanding in a direction of airflow there within;

b) a plurality of substantially vertical support members;

c) a hollow member wherein the hollow member expands in cross section in the direction of air flow;

d) a rotating member disposed above the central collection chamber wherein the rotating member is connected to a generator to generate electricity from rotation of the rotating member;

wherein the rotating member is connected to the omni directional, shrouded vertical wind turbine and located near an inlet of the hollow member;

wherein each of the plurality of curved members is connected to at least one of the plurality of substantially vertical support members so as to form a plurality of air inlets into the central collection chamber;

wherein at least one of the plurality of curved members and the plurality of substantially vertical support members are shaped and spaced to direct air to a diametrically opposite side of an internal aspect of the omni directional, shrouded vertical wind turbine so as to form an air gate to reduce air leakage on the diametrically opposite side and adjacent sides of the internal aspect of the omni directional, shrouded vertical wind turbine;

wherein the plurality of curved members and the plurality of substantially vertical support members are shaped and spaced to focus air directly to an entire lower surface of the rotating member;

wherein the plurality of curved members form a central collection chamber that expands in cross section from a location furthest from the rotating member to a location nearest the rotating member.

2. The omni-directional, shrouded vertical wind turbine according to claim 1 wherein the plurality of curved members include toroid shaped radially curving blades.

3. The omni-directional, shrouded vertical wind turbine according to claim 1 wherein the plurality of substantially vertical support members includes vertical walls.

4. The omni-directional, shrouded vertical wind turbine according to claim 1 above wherein the rotating member includes a horizontal—axis type wind turbine rotor, mounted vertically.

5. The omni-directional, shrouded vertical wind turbine according to claim 1 above wherein the hollow member includes a diffuser.

6. The omni-directional, shrouded vertical wind turbine according to claim 2 above wherein the plurality of curved members have an aerofoil cross section.

7. The omni-directional, shrouded vertical wind turbine according to claim 1 above wherein all of the plurality of curved members have varying perimeter diameters and annular diameters.

8. The omni-directional, shrouded vertical wind turbine according to claim 1 above wherein the plurality of curved members are secured in place in a concentric arrangement.

9. The omni-directional, shrouded vertical wind turbine according to claim 1 above wherein the plurality of curved members are vertically staggered.

10. The omni-directional, shrouded vertical wind turbine according to claim 1 above wherein the plurality of curved members are disposed in a stacked arrangement.

11. The omni-directional, shrouded vertical wind turbine according to claim 1 above wherein the plurality of curved members have an overlapping arrangement.

12. The omni-directional, shrouded vertical wind turbine according to claim 1, above wherein the central collection chamber converges towards a central throat region.

13. The omni-directional, shrouded vertical wind turbine according to claim 12 above wherein the central collection chamber is continuous with an internal aspect of the hollow member.

14. The omni-directional, shrouded vertical wind turbine according to claim 1 above wherein the plurality of substantially vertical support members are aerodynamically shaped.

15. The omni-directional, shrouded vertical wind turbine according to claim 4 above wherein the rotating member is mounted, with its axis vertical, near the central throat region.

16. The omni-directional, shrouded vertical wind turbine according to claim 1 above wherein the rotating member includes airfoil blades.

17. The omni-directional, shrouded vertical wind turbine according to claim 1 above wherein focusing of air entering the shroud by the plurality of curved members results in the air gate being formed across air passages formed by inactive members of the plurality of curved members so as to reduce air leakage.

18. The omni-directional, shrouded vertical wind turbine according to claim 17 above wherein the lowermost of the plurality of curved members is shaped and configured to direct the air to the inactive curved members at a lower pressure than air external to the shroud so as to contribute to the air gate.

19. The omni-directional, shrouded vertical wind turbine according to claim 1 above wherein the orientation of the plurality of curved members and the plurality of substantially vertical support members receive and use wind coming from substantially any direction.

20. The omni-directional, shrouded vertical wind turbine according to claim 1 above wherein the orientation of the plurality of curved members and the plurality of substantially vertical support members directs air across the full swept area of the rotating member.

21. The omni-directional, shrouded vertical wind turbine according to claim 1 above wherein the rotating member is connected via a rotating shaft to an electricity generating power train assembly and device.

22. The omni-directional, shrouded vertical wind turbine according claim 1 above including between 3 and 6 substantially vertical support members to secure the plurality of curved members, between a bell mouth upper body and a base supporting plate.

23. The omni-directional, shrouded vertical wind turbine according claim 22 above wherein the plurality of substantially vertical support members include a reversed aerofoil section with identical surface curvatures on both vertical wall faces of the reversed aerofoil section.

24. The omni-directional, shrouded vertical wind turbine according to claim 23 above wherein the plurality of substantially vertical support members has boundary layer preserving air channels formed from a leading edge to a trailing half of both faces of each of the plurality of substantially vertical support members.

25. The omni-directional, shrouded vertical wind turbine according claim 24 above wherein the boundary layer preserving air channels exit both faces of each of the plurality of substantially vertical support members tangentially at an angle less than 15 degrees to an outer surface.

26. The omni-directional, shrouded vertical wind turbine according to claim 22 above having the plurality of substantially vertical support members arranged radially at equal intervals, from the plurality of air inlets to a perimeter of the central collection chamber.

27. The omni-directional, shrouded vertical wind turbine according to claim 23 above wherein the plurality of substantially vertical support members includes an aerofoil wall blade thickness being between 35%-50% of chord length.

28. The omni-directional, shrouded vertical wind turbine according to claim 22 above wherein a thickest point of each of the plurality of substantially vertical support members is greater than 51% of the chord length from the leading edge.

29. The omni-directional, shrouded vertical wind turbine according to claim 23 above with an included angle between two faces of each of the plurality of substantially vertical support members being in the range 75-150 degrees and within 15% of the chord length from a trailing edge.

30. The omni-directional, shrouded vertical wind turbine according to claim 2 above including four or more, horizontal to near vertical curved toroidal blades varying in internal annulus diameter from 20% to 145% of the rotor diameter.

31. The omni-directional, shrouded vertical wind turbine according to claim 2 above with convex and concave surface radii of curvature of each of the plurality of curved members being equal to between 25% and 55% of the diameter of the rotating member.

32. The omni-directional, shrouded vertical wind turbine according to claim 2 above wherein the plurality of curved members start to curve with an angle less than 20 degrees to the horizontal at an outer diameter and finish at a vertical bending angle of between 50 to 70 degrees to a horizontal direction.

33. The omni-directional, shrouded vertical wind turbine according to claim 10 above with a slope of a shortest straight line connecting an inner perimeter of a largest of the plurality of curved members to an inner perimeter of any of the other plurality of curved members and any vertical axis being between 5 to 35 degrees.

34. The omni-directional, shrouded vertical wind turbine according to claim 11 above with the plurality of curved members stacked with spacing in between the plurality of curved members such that a leading edge and trailing edge of each of the plurality of curved members overlap by a minimum amount of 2% of a diameter of the rotating member.

35. The omni-directional, shrouded vertical wind turbine according to claim 1 above with the plurality of curved members focusing air entering the shroud across a full swept area of the rotating member.

36. The omni-directional, shrouded vertical wind turbine according to claim 1 above where an internal exit passage area of the omni-directional wind turbine is a minimum of 25% and a maximum 75% of an external perimeter entry passage area between any pair of the plurality of curved members.

37. The omni-directional, shrouded vertical wind turbine according to claim 12 above where the throat region has an area that is not less than 70% of the annular core area of the uppermost member of the plurality of curved members.

38. The omni-directional, shrouded vertical wind turbine according to claim 37 above wherein the uppermost member of the plurality of curved members is a bell mouth toroid blade.

39. The omni-directional, shrouded vertical wind turbine according to claim 6 above including multiple air passages formed within at least one of the plurality of curved members to transfer air from a concave surface side to a convex surface side of the at least one of the plurality of curved members.

40. The omni-directional, shrouded vertical wind turbine according to claim 39 above including multiple air passages terminating and exiting the convex surface side of at least one of the plurality of curved members tangentially at less than 15 degrees to a surface of the at least one of the plurality of curved members.

41. The omni-directional, shrouded vertical wind turbine according to claim 5 above where a discharge outlet of a concentric open top of the hollow member has a diameter that is between 130% and 180% of the diameter of the rotating member.

42. The omni-directional, shrouded vertical wind turbine according to claim 1 above where an open top discharge outlet of the hollow member is provided with a horizontal wedge and collar around its perimeter.

43. The omni-directional, shrouded vertical wind turbine according to claim 42 above with the wedge located below an outlet of the hollow member at a height of between 7%-19% of an upper diameter of the hollow member.

44. The omni-directional, shrouded vertical wind turbine according to any claim 42 above where a face length of the wedge is between 135%-160% of a height of the collar of the hollow member.

45. The omni-directional, shrouded vertical wind turbine according to claim 1 above including additional mini-wedges placed circumferentially around an external body of the hollow member and spaced evenly below a main wedge with multiple air passages from an outer surface to an inside surface of the hollow member.

46. The omni-directional, shrouded vertical wind turbine according to claim 45 above including multiple air passages terminating and exiting an internal face of the hollow member tangentially to an inner surface of the hollow member, in the expanding direction of the hollow member.

47. The omni-directional, shrouded vertical wind turbine according to claim 1 above where an electricity generating unit is placed directly above the rotating member in an independently supported nacelle that is down stream of a shadow of the rotating member.

48. The omni-directional, shrouded vertical wind turbine according to claim 1 above having the nacelle secured by a "sloped" radial support structure connected to the hollow member.

49. The omni-directional, shrouded vertical wind turbine according to claim 1 above where electricity generating units are placed directly below the rotating member in an independently supported rotor hub nose cone.

50. The omni-directional, shrouded vertical wind turbine according to claim 1 above having a nose cone secured by a column support structure extending from a base supporting plate to the nose cone.

51. The omni-directional, shrouded vertical wind turbine according to claim 1 above where the rotating member is connected to a complete power generation assembly via a rotating shaft on supporting bearings.

52. The omni-directional, shrouded vertical wind turbine according to claim 1 above wherein the plurality of curved members includes non toroidal vertically curved blades connected to each other in a closed polygon arrangement.

53. The omni-directional, shrouded vertical wind turbine according to claim 42 above with the sloping surface of the collar forming an angle between 5-20 degrees to a vertical direction.

54. The omni-directional, shrouded vertical wind turbine according to claim 1 above wherein the hollow member is substantially semi ellipsoid with angles of tangent specified at a starting location on the ellipsoid and at a finishing location.

55. The omni-directional, shrouded vertical wind turbine according to claim 42 above where an angle formed by an upper surface of the wedge to a horizontal is between 10-60 degrees.

* * * * *